(12) United States Patent
Luling

(10) Patent No.: US 8,694,259 B2
(45) Date of Patent: *Apr. 8, 2014

(54) SIMULTANEOUS INVERSION OF INDUCTION DATA FOR DIELECTRIC PERMITTIVITY AND ELECTRIC CONDUCTIVITY

(75) Inventor: Martin G. Luling, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,932

(22) Filed: Feb. 1, 2012

(65) Prior Publication Data

US 2012/0143509 A1 Jun. 7, 2012

Related U.S. Application Data

(63) Continuation-in-part of application No. 12/404,454, filed on Mar. 16, 2009, now Pat. No. 8,135,542.

(30) Foreign Application Priority Data

Mar. 28, 2008 (EP) .................................... 08153574

(51) Int. Cl.
*G01V 1/40* (2006.01)
*G01V 3/10* (2006.01)

(52) U.S. Cl.
USPC .............................................. 702/7; 324/339

(58) Field of Classification Search
USPC ............. 702/7, 1–2, 6, 11–14, 16, 57, 64–67, 702/70–71, 73, 81, 84, 182–183, 189; 703/5, 10; 324/323–324, 339, 324/345–351, 366
See application file for complete search history.

(56) References Cited

U.S. PATENT DOCUMENTS 4,209,747 A 6/1980 Huchital
4,471,436 A 9/1984 Schaefer et al.
(Continued)

FOREIGN PATENT DOCUMENTS

GB 2354077 3/2001
WO 02/082353 10/2002

OTHER PUBLICATIONS

Q-H. Liu, "DBIM for the Inversion of Two-Dimensional Axisymmertric Inhomogeneous Media", IEEE 1993, pp. 504-507.

(Continued)

*Primary Examiner* — Toan Le
(74) *Attorney, Agent, or Firm* — Stephanie Chi; Jody DeStefanis

(57) ABSTRACT

A method of inverting induction logging data for evaluating the properties of underground formations surrounding a borehole, the data including induction voltage measurements obtained from a tool placed close to the formations of interest, the method includes: (a) defining a relationship relating the induction voltage to wave number, dielectric permittivity and conductivity; defining a cubic polynomial expansion of the relationship; and solving the cubic polynomial relationship using the voltage measurements to obtain values for conductivity that includes skin-effect correction, and apparent dielectric permittivity; and (b) using the obtained values for conductivity and apparent dielectric permittivity to derive a simulated value of induction voltage; determining the difference between the simulated value of the induction voltage and the measured induction voltage; and iteratively updating the values of conductivity and dielectric permittivity used for the derivation of the simulated value of induction voltage to minimize its difference with respect to the measured value.

20 Claims, 3 Drawing Sheets

(56) References Cited

U.S. PATENT DOCUMENTS

| | | | |
|---|---|---|---|
| 5,345,179 A | 9/1994 | Habashy et al. | |
| 8,135,542 B2 * | 3/2012 | Luling | 702/7 |
| 2004/0154831 A1 | 8/2004 | Seydoux et al. | |

OTHER PUBLICATIONS

J.D. Jackson, "Classical Electrodynamics," Wiley 3rd Ed. (1998), ch. 9, pp. 407-455.

M. Abramowitz, I.A. Stegun, "Handbook of Mathematical Functions With Formulas, Graphs, and Mathematical Tables," Dover 1964, 9th Ed. 1972, ch. 3, pp. 10-23.

L. V. Ahlfors, "Complex Analysis—an introduction to the theory of analytic functions of one complex variable," 1966, McGraw Hill pp. 21-33.

* cited by examiner

SIMULTANEOUS INVERSION OF INDUCTION DATA FOR DIELECTRIC PERMITTIVITY AND ELECTRIC CONDUCTIVITY

CROSS REFERENCE TO RELATED APPLICATIONS

This application is a continuation-in-part of U.S. application Ser. No. 12/404,454, filed Mar. 16, 2009, now U.S. Pat. No. 8,135,542, which claims the benefit under 35 U.S.C. 119 of European patent application No. 08153574.2, filed Mar. 28, 2008, both applications incorporated by reference herewith in their entirety.

TECHNICAL FIELD

This invention relates to techniques for the inversion of induction logging data such as that used for evaluation of underground formations surrounding a borehole. In particular, the invention relates to the simultaneous inversion of induction data to derive the dielectric permittivity and electric conductivity of the formation.

BACKGROUND ART

When drilling boreholes in the oil and gas industry, the nature of the underground formations surrounding the borehole is typically obtained by making physical and/or chemical measurements with tools (often called sondes) located in the borehole, the measurement responses of which are affected by the properties of the formations. A series of such measurements made along the length of the borehole is known as a log and one common form of log is that of a measurement relating to the electrical resistivity of the formation. Resistivity logging techniques are typically classified as either laterologs or induction logs.

Induction logs use an electric coil in the sonde to generate an alternating current loop in the formation by induction. The alternating current loop, in turn, induces a current in a receiving coil located elsewhere on the sonde. The amount of current in the receiving coil is proportional to the intensity of current loop, hence to the conductivity (reciprocal of resistivity) of the formation. Multiple transmitting and receiving coils can be used to focus formation current loops both radially (depth of investigation) and axially (vertical resolution). Known types of induction logging sondes are the 6FF40 sonde which is made up of six coils with a nominal spacing of 40 inches, and so-called array induction tools. These comprise a single transmitting coil and a large number of receiving coils. Radial and axial focusing is performed by software rather than by the physical layout of coils.

Induction tools date back to the late 1940s and have so far been based on an assumption of negligible dielectric effects in induction-tool design, processing and interpretation. Induction tools have become the industry mainstay resistivity-saturation measurement since their introduction in the 1950s. The fundamental feature is a direct measurement of the electric conductivity deep in the formation. The basic measurement is mostly unperturbed by any parasitic effects and therefore is quite easily interpreted.

Recent developments of induction tools have provided accurate measurements of in-phase and quadrature signals. The quadrature signal is used to provide a skin-effect correction to the in-phase signal. Traditionally, induction-tool processing and interpretation neglects dielectric effects completely. The present invention re-introduces dielectric effects into induction-tool processing and proposes two simple inversion algorithms that can be used to determine a dielectric permittivity and electric conductivity from the in-phase and quadrature signals simultaneously.

SUMMARY OF THE INVENTION

A first aspect of the invention provides a method of inverting induction logging data for evaluating the properties of underground formations surrounding a borehole, the data comprising induction voltage measurements obtained from a tool placed close to the formations of interest, the method comprising:

(a) defining a relationship relating the induction voltage to wave number, dielectric permittivity and conductivity;

defining a cubic polynomial expansion of the relationship; and solving the cubic polynomial relationship using the voltage measurements to obtain values for conductivity that includes skin-effect correction, and apparent dielectric permittivity; and (b) using the obtained values for conductivity and apparent dielectric permittivity to derive a simulated value of induction voltage;

determining the difference between the simulated value of the induction voltage and the measured induction voltage; and iteratively updating the values of conductivity and dielectric permittivity used for the derivation of the simulated value of induction voltage to minimise its difference with respect to the measured value.

Preferably, the relationship relating induction voltage to wave number, dielectric permittivity and conductivity is:

$$k = \frac{\omega}{c}\sqrt{\mu_r}\sqrt{\varepsilon_r + i\frac{\sigma}{\omega\varepsilon_0}}$$

where k is wave number, $\omega$ is circular frequency, c is the speed of light in a vacuum, $\mu_r$ is relative magnetic permeability, $\varepsilon_r$ is relative permittivity, $\varepsilon_0$ is the absolute dielectric permittivity of a vacuum and $\sigma$ is conductivity.

The method typically comprises deriving the roots of the cubic polynomial and using at least one of the roots to obtain the wave number. Roots giving physically impossible values for parameters of interest can be ignored.

The step of iteratively updating the values of conductivity and dielectric permittivity used for the derivation of the simulated value of induction voltage to minimise its difference with respect to the measured value preferably comprises minimising the squared difference between measured induction voltage $U_{meas}$ and their simulated reproduction $U_{simul}$ according to the relationship:

$$L = \frac{1}{2}(U_{meas} - U_{simul})^2 \Rightarrow \frac{d}{dk}L = (U_{meas} - U_{simul})\frac{dU_{simul}}{dk} = 0.$$

In some embodiments, the iteration can use a Newton-Raphson algorithm $$U_{meas} - U_{simul}^{(n-1)} = \frac{dU_{simul}^{(n-1)}}{dk}(k^{(n)} - k^{(n-1)})$$

The iterative update for the wave number $k^{(n)}$ is derived from the relationship:

$$k^{(n)} = k^{(n-1)} + (U_{meas} - U_{simul}^{(n-1)})/(dU_{simul}^{(n-1)}/dk).$$

In some embodiments, the iteration can use a quadratic algorithm:

$$U_{meas} = U_{simul}^{(n-1)} + \frac{dU_{simul}^{(n-1)}}{dk}(k^{(n)} - k^{(n-1)}) + \frac{1}{2}\frac{d^2 U_{simul}^{(n-1)}}{dk^2}(k^{(n)} - k^{(n-1)})^2$$

and the iterative update for the wave number $k^{(n)}$ is derived from the relationship:

$$k^{(n)} = k^{(n-1)} - \frac{dU_{simul}^{(n-1)}/dk}{d^2 U_{simul}^{(n-1)}/dk^2}$$
$$\pm \sqrt{\left(\frac{dU_{simul}^{(n-1)}/dk}{d^2 U_{simul}^{(n-1)}/dk^2}\right)^2 - 2\frac{U_{simul}^{(n-1)} - U_{meas}}{d^2 U_{simul}^{(n-1)}/dk^2}}$$

In some embodiments, the iteration can use a cubic algorithm:

$$U_{meas} = U_{simul}^{(n-1)} + \frac{dU_{simul}^{(n-1)}}{dk}(k^{(n)} - k^{(n-1)}) +$$
$$\frac{1}{2}\frac{d^2 U_{simul}^{(n-1)}}{dk^2}(k^{(n)} - k^{(n-1)})^2 + \frac{1}{6}\frac{d^3 U_{simul}^{(n-1)}}{dk^3}(k^{(n)} - k^{(n-1)})^3$$

and the iterative update for the wave number $k^{(n)}$ is derived from the relationship:

$$(k^{(n)} - k^{(n-1)})^3 + 3\frac{d^2 U_{simul}^{(n-1)}/dk^2}{d^3 U_{simul}^{(n-1)}/dk^3}(k^{(n)} - k^{(n-1)})^2 +$$
$$6\frac{dU_{simul}^{(n-1)}/dk}{d^3 U_{simul}^{(n-1)}/dk^3}(k^{(n)} - k^{(n-1)}) + 6\frac{U_{simul}^{(n-1)} - U_{meas}}{d^3 U_{simul}^{(n-1)}/dk^3} = 0$$

Furthermore, higher-order polynomials may be used in an analogous manner. Alternately, other, non-polynomial approximations may be used.

Preferably, the voltage measurements comprise in-phase and quadrature measurements of substantially the same accuracy and resolution, which can be processed in parallel.

Where the induction logging data is obtained from a three-coil tool comprising a transmitter coil with magnetic dipole moment $M_T$, a main receiver coil with magnetic dipole moment $M_1$ at distance $r_1$ from the transmitter coil, and a bucking coil with a magnetic moment $M_2$ at distance $r_2$ from the transmitter coil, the dipole moments being aligned parallel to the axis of the tool, the cubic polynomial expansion can comprise:

$$U_l = -i\omega\mu\frac{M_T}{2\pi}\left(\left(\frac{M_1}{2r_1} - \frac{M_2}{2r_2}\right)k^2 + i\left(\frac{M_1}{3} - \frac{M_2}{3}\right)k^3\right)$$

wherein $U_l$ is the induction voltage.

In this case, the simulated value of induction voltage can be derived according to the relationship $$U_l = -i\omega\mu\frac{M_T}{2\pi}\left(\frac{M_1 e^{ikr_1}}{r_1^3}(1 - ikr_1) - \frac{M_2 e^{ikr_2}}{r_2^3}(1 - ikr_2)\right)$$

using a sensitivity function derived according to the relationship:

$$\frac{dU_l}{dk} = -i\omega\mu\frac{M_T}{2\pi}\left(\frac{M_1 e^{ikr_1}}{r_1} - \frac{M_2 e^{ikr_2}}{r_2}\right)k$$

where $e^{ikr}$ is the full electromagnetic wave.

Where the dipole moments are aligned transverse to the axis of the tool, the cubic polynomial expansion can comprise:

$$U_t = -i\omega\mu\frac{M_T}{4\pi}\left(\left(\frac{M_1}{2r_1} - \frac{M_2}{2r_2}\right)k^2 + 2i\left(\frac{M_1}{3} - \frac{M_2}{3}\right)k^3\right)$$

wherein $U_t$ is the induction voltage.

In this case, the simulated value of induction voltage can be derived according to the relationship $$U_t = -i\omega\mu\frac{M_T}{4\pi}\left(\frac{M_1 e^{ikr_1}}{r_1^3}(1 - ikr_1 - k^2 r_1^2) - \frac{M_2 e^{ikr_2}}{r_2^3}(1 - ikr_2 - k^2 r_2^2)\right)$$

using a sensitivity function derived according to the relationship:

$$\frac{dU_t}{dk} = i\omega\mu\frac{M_T}{4\pi}\left(\frac{M_1 e^{ikr_1}}{r_1}(1 + ikr_1) - \frac{M_2 e^{ikr_2}}{r_2}(1 + ikr_2)\right)k.$$

Further aspects of the invention, for example, the acquisition of data, will be apparent from the following description.

MODE(S) FOR CARRYING OUT THE INVENTION

Figure 1:
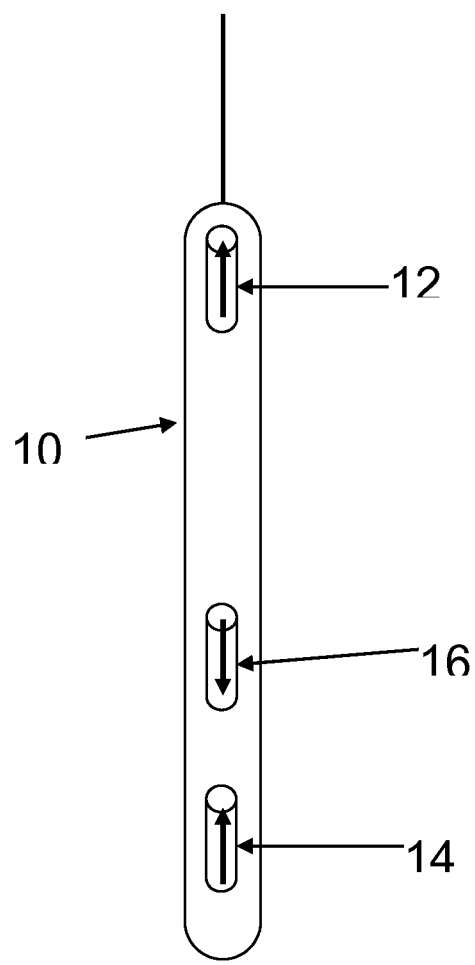
FIG. 1 shows a schematic diagram of one embodiment of a three-coil induction sonde in a borehole.

FIG. 1 shows a schematic diagram of one embodiment of a three-coil induction sonde in a borehole. The sonde 10 comprises a transmitter coil 12 and a main receiver coil 14 spaced from the transmitter 12 on the sonde 10. A bucking coil 16 is positioned on the sonde 10 between the transmitter 12 and receiver 14. In this embodiment, the dipole moments of the coils 12, 14, 16 are parallel to the sonde axis (longitudinally polarised). The transmitter and receiver coils 12, 14 are arranged so as to have the same polarisation whereas the bucking sonde 16 has a polarisation that is reversed. An example of such a sonde is the Array Induction Tool (AIT) of Schlumberger.

Figure 2:
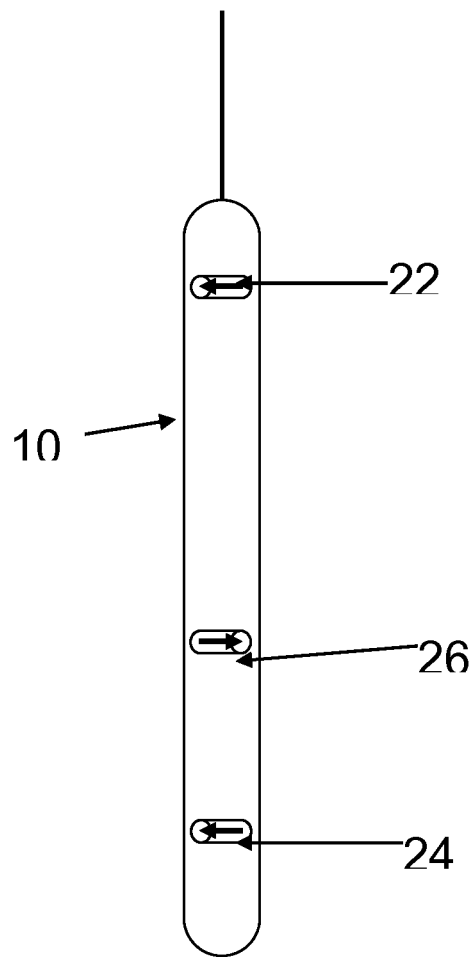
FIG. 2 shows a schematic diagram of another embodiment of a three-coil induction sonde in a borehole.

FIG. 2 shows a schematic diagram of another embodiment of a three-coil induction sonde 20. In this embodiment, the dipole moments of the coils 22, 24, 26 are perpendicular to the sonde axis (transversely polarised). Again, the bucking sonde 26 has a polarisation that is reversed compared to the transmitter 22 and receiver 24. An example of such a sonde is the RtScanner of Schlumberger and the TriDEX tool of Baker-Hughes.

Figure 3:
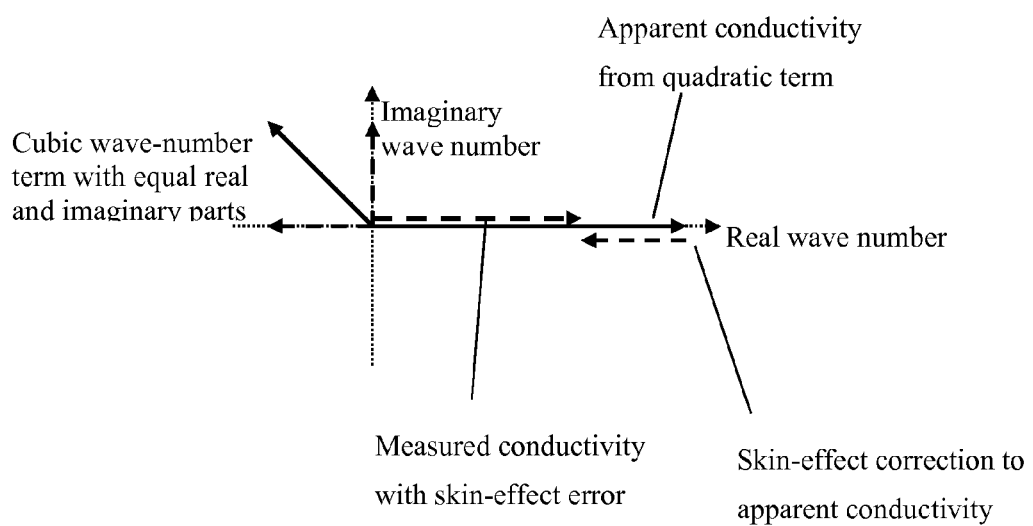
FIG. 3 shows schematically the quadratic and cubic terms considered in known induction processing with skin-effect correction.

Operation of the tools shown in FIGS. 1 and 2 to obtain induction voltage data is well-known. FIG. 3 shows schematically the quadratic and cubic terms considered in known induction processing with skin-effect correction.

An induction tool generates an electric field in the surrounding formation by an alternating current in a transmitter coil, which constitutes an oscillating magnetic dipole. The magnetic dipole generates a magnetic field, which is described by the Maxwell-Ampere equation:

$$\vec{\nabla} \times \vec{H} = \partial_t \vec{D} + \vec{j} \qquad (1)$$

This equation combines the displacement current $\vec{D}$ with the galvanic-current density $\vec{j}$. The displacement current is related to the electric field $\vec{E}$ by the dielectric permittivity $\in$, while Ohm's law in microscopic form relates the galvanic-current density $\vec{j}$ and the electric field $\vec{E}$ through the electric conductivity $\sigma$. Only the transmitter current is explicitly carried through as source-current density $\vec{j}_0$. The induction sonde serves to provide the electric conductivity for saturation estimation.

J. D. Jackson, Classical Electrodynamics, Wiley 3$^{rd}$ Ed. (1998), ch. 9, eq. (9.35), p. 413. derives the close-form solution of a magnetic point-dipole radiator in a homogeneous, isotropic medium. The magnetic field of this dipole is:

$$\vec{H}(\vec{r}) = \frac{e^{ikr}}{4\pi r^3}\left(\begin{array}{l}\hat{n}\times(\vec{M}\times\hat{n})k^2 r^2 + \\ (3\hat{n}(\vec{M}\cdot\hat{n})-\vec{M})(1-ikr)\end{array}\right) \qquad (2)$$

with the magnetic-dipole moment $\vec{M}$ and the distance vector between radiator and observation point $\vec{r}$ with normal direction $\hat{n}=\vec{r}/r$. The wave number is given in terms of the circular frequency $\omega$ with the universal time dependence $e^{-i\omega t}$ and the electromagnetic material parameters $\in$, $\sigma$, $\mu$:

$$k = \sqrt{\omega\mu(\omega\varepsilon + i\sigma)} = \frac{\omega}{c}\sqrt{\mu_r}\sqrt{\varepsilon_r + i\frac{\sigma}{\omega\varepsilon_0}} \qquad (3)$$

where c is the speed of light in vacuum. Usually, the relative magnetic permeability of the formation is simply set to $\mu_r=1$.

The magnetic field from a transmitter dipole $\vec{M}_T$ will induce a voltage U in a receiver magnetic dipole $\vec{M}_R$ according to Faraday's law:

$$U = \partial_t \vec{B} \cdot \vec{M}_R = -i\omega\mu \vec{H} \cdot \vec{M}_R \qquad (4)$$

The magnetic field from equation (2) provides the close-form solution for the induced voltage, which is symmetric in transmitter and receiver dipole moments:

$$U = -i\omega\mu \frac{e^{ikr}}{4\pi r^3}\left(\begin{array}{l}(\vec{M}_T\times\hat{n})\cdot(\vec{M}_R\times\hat{n})k^2 r^2 + \\ (3(\vec{M}_T\cdot\hat{n})(\vec{M}_R\cdot\hat{n})-\vec{M}_T\cdot\vec{M}_R)(1-ikr)\end{array}\right) \qquad (5)$$

This solution is used to describe and invert the three-coil point-dipole induction sondes for either polarization.

A longitudinally polarized induction sonde, such as the AIT (see FIG. 1) has dipole moments parallel to the tool axis: $\vec{M}_T \| \vec{M}_R \| \vec{r}$; hence $(\vec{M}_T\times\hat{n})=0=(\vec{M}_R\times\hat{n})$ and $(\vec{M}_T\times n\hat{n})\cdot(\vec{M}_R\cdot\hat{n})=\vec{M}_T\cdot\vec{M}_R$. On the other hand, the RtScanner sonde (see FIG. 2) has transversely polarized dipoles with $\vec{M}_T \| \vec{M}_R \perp \vec{r}$; hence $(\vec{M}_T\cdot n\hat{n})=0=(\vec{M}_R\cdot\hat{n})$ and $(\vec{M}_T\times\hat{n})\cdot(\vec{M}_R\times\hat{n})=\vec{M}_R\times\vec{M}_T\cdot\vec{M}_R$. These vectorial projections simplify the induced-voltage expression (5) for either polarization (l or t):

$$U_l = -i\omega\mu \frac{e^{ikr}}{4\pi r^3} 2\vec{M}_T \cdot \vec{M}_R (1-ikr) \qquad (6l)$$

$$U_t = i\omega\mu \frac{e^{ikr}}{4\pi r^3} \vec{M}_T \cdot \vec{M}_R (1-ikr-k^2 r^2) \qquad (6t)$$

These two cases can be considered in parallel, yet independent from each other.

In the low-frequency or long-wavelength limit kr<<1, the exponential is expanded in a rapidly converging Taylor series. This series is to cubic order:

$$e^{ikr} \cong 1 + ikr - \frac{k^2 r^2}{2} - i\frac{k^3 r^3}{6} + \ldots \qquad (7)$$

This Taylor expansion is multiplied with the corresponding parentheses in equations (6) to yield the two cubic polynomials:

$$\left(1 + ikr - \frac{k^2 r^2}{2} - i\frac{k^3 r^3}{6}\right)(1-ikr) \cong 1 + \frac{k^2 r^2}{2} + i\frac{k^3 r^3}{3} \qquad (8l)$$

$$\left(1 + ikr - \frac{k^2 r^2}{2} - i\frac{k^3 r^3}{6}\right)(1-ikr-k^2 r^2) \cong 1 - \frac{k^2 r^2}{2} - 2i\frac{k^3 r^3}{3} \qquad (8t)$$

The leading term 1 dominates these expansions; however, it does not contain any formation information. The next leading term is $k^2 r^2$, which is proportional to the complex-valued dielectric constant, or with negligible permittivity proportional to the electric conductivity. Therefore, the leading term must be eliminated.

The leading term is the same in both polarizations. This term must be eliminated to render the measurement sensitive to the formation conductivity. This elimination is accomplished by a bucking receiver, leading to the three-coil design.

This three-coil design is the basic building block of all modern array induction tools. The main and bucking receiver are at distances $r_1$ and $r_2$ with magnetic dipole moments $M_1$ and $M_2$. The combined signal voltage is then:

$$U_l = -i\omega\mu \frac{M_T}{2\pi}\left[\frac{M_1}{r_1^3}\left(1 + \frac{k^2 r_1^2}{2} + i\frac{k^3 r_1^3}{3}\right) - \frac{M_2}{r_2^3}\left(1 + \frac{k^2 r_2^2}{2} + i\frac{k^3 r_2^3}{3}\right)\right] \quad (9l)$$

$$U_t = i\omega\mu \frac{M_T}{4\pi}\left[\frac{M_1}{r_1^3}\left(1 - \frac{k^2 r_1^2}{2} - 2i\frac{k^3 r_1^3}{3}\right) - \frac{M_2}{r_2^3}\left(1 - \frac{k^2 r_2^2}{2} - 2i\frac{k^3 r_2^3}{3}\right)\right] \quad (9t)$$

The condition eliminating the leading term in either equation is:

$$\frac{M_1}{r_1^3} - \frac{M_2}{r_2^3} = 0 \quad (10)$$

which determines the bucking-receiver dipole moment in terms of the main receiver moment and the distances to $M_2 = M_1 r_2^3/r_1^3$ or the bucking-receiver distance in terms of the main receiver distance and the two receiver dipole moments to $r_2 = r_1 \sqrt[3]{M_2/M_1}$.

Usually, the main-receiver distance and dipole moment are fixed. The bucking-receiver distance is then approximately fixed and its dipole moment is determined in terms of number of turns of the two receiver coils. These number of turns are integer valued; so after fixing the dipole moments the bucking-receiver distance is adjusted to fulfil the bucking condition (10).

In the following analysis the two receivers will be carried through as independent variables; the bucking condition (10) is implicitly assumed throughout the rest of this study. The leading term is simply omitted from here on.

The dielectric permittivity $\in = \in_r \in_0$ contains the relative permittivity $\in_r$ without units and the absolute dielectric permittivity of vacuum $\in_0 (\cong 8.8542 \cdot 10^{-12}$ As/Vm). This absolute dielectric permittivity is a very small number, which is combined with the circular frequency $\omega (=2\pi f)$ into a conductivity scale $\sigma_0 = \omega \in_0$. An induction frequency of 25 kHz leads to a conductivity scale of $\sigma_0 = \omega \in_0 \cong 1.4$ μS/m. This conductivity scale is so small compared to typical formation conductivities that dielectric-permittivity effects commonly are neglected in induction processing and interpretation. Hence the Maxwell-Ampere equation (1) is simplified to:

$$\vec{\nabla} \times \vec{H} \cong \sigma \vec{E} + \vec{j}_0 \quad (11)$$

This induction approximation simplifies the wave equation and hence the wave number:

$$k = \frac{\omega}{c}\sqrt{\mu_r}\sqrt{\epsilon_r + i\frac{\sigma}{\omega\epsilon_0}} \cong \sqrt{i\omega\mu_0\sigma} \quad (12)$$

using the identity $c^2 = 1/\in_0 \mu_0$ from the wave equation. The relative magnetic permeability has been set to $\mu_r = 1$.

In this approximation the squared wave number is directly proportional to the electric conductivity. The induced-voltage signals (9) become:

$$U_l = -i\omega\mu \frac{M_T}{2\pi}\left(\frac{M_1}{2r_1} - \frac{M_2}{2r_2} + i\frac{k}{3}(M_1 - M_2)\right)k^2 \quad (13l)$$
$$= \omega^2 \mu^2 \frac{M_T}{2\pi}\left(\frac{M_1}{2r_1} - \frac{M_2}{2r_2} + i\frac{k}{3}(M_1 - M_2)\right)\sigma$$

$$U_t = -i\omega\mu \frac{M_T}{4\pi}\left(\frac{M_1}{2r_1} - \frac{M_2}{2r_2} + 2i\frac{k}{3}(M_1 - M_2)\right)k^2 \quad (13t)$$
$$= \omega^2 \mu^2 \frac{M_T}{4\pi}\left(\frac{M_1}{2r_1} - \frac{M_2}{2r_2} + 2i\frac{k}{3}(M_1 - M_2)\right)\sigma$$

To lowest order in the wave number the apparent conductivity $\sigma_a$ is thus given by the measured in-phase or R-signal voltage for either polarization:

$$\sigma_{al} = \frac{2\pi}{\omega^2 \mu^2 M_T} \frac{1}{M_1/2r_1 - M_2/2r_2} U_l \quad (14l)$$

$$\sigma_{at} = \frac{4\pi}{\omega^2 \mu^2 M_T} \frac{1}{M_1/2r_1 - M_2/2r_2} U_t \quad (14t)$$

The next-order term contains an additional wave-number factor.

The real and imaginary part of this induced-voltage signal constitutes the in-phase and quadrature signals. The cubic term in equations (13) contains an imaginary unit in the square root, which leads to equal real and imaginary parts. The real part appears negative and thus is subtracted from the leading, quadratic-order term. This subtraction artificially reduces the apparent conductivity or increases the apparent resistivity.

$$k \cong \sqrt{i\omega\mu_0\sigma} = (1+i)\sqrt{\frac{\omega\mu_0\sigma}{2}} \quad (15)$$

Hence the real and imaginary part, or the R- and the X-signal contributions from this term are equal. If higher-order terms are truly negligible the X-signal term is independent. The contribution of the real, in-phase part is superposed on the leading term, causing a distortion that is attributed to the skin effect. By itself, this distortion cannot be filtered from the in-phase signal. However, the quadrature signal constitutes exactly the same signal as the distortion and this can be used to correct the apparent conductivity. (FIG. 3)

The imaginary part can be directly and independently measured as quadrature signal. As part of advanced induction processing it can be added to the leading in-phase term, where it will effectively compensate for the skin-effect distortion. This correction is used in modern array-induction tools, providing the skin-effect-corrected apparent conductivity. This correction gives good results for conductivities below 100 mS/m (resistivities above 10 Ωm). For more conductive formations the skin-effect correction rapidly becomes larger, so that around 1000 mS/m (resistivity of 1 Ωm) it is around 25% for a 27"-39" receiver-coil pair. In this situation higher-order terms of the wave number are no longer negligibly small.

The quadrature signal can provide an accurate correction for the cubic in-phase distortion. For such a correction it is important that both in-phase and quadrature signal be measured with equally high accuracy and precision since it is impossible to infer any such correction from an auxiliary measurement at a different frequency. Notably, the formation properties usually are slightly frequency dependent, so that a high-precision correction cannot reliably be derived from a different-frequency measurement.

The known induction tools are designed with the assumption that dielectric effects are negligibly small at the comparatively low operating frequencies. This assumption has reduced the complex-valued character for the formation measurement to a simpler, real-valued conductivity measurement. The complex-valued measurement is used to improve the apparent conductivity by the skin-effect correction. However, recent processing and interpretation of some strange induction logs using the known techniques have led to observations of unexpectedly large dielectric permittivities in some shales with values between 10000 and 50000 for measurements at 26 kHz and at 52 kHz. The induction-processing according to the invention explicitly includes permittivity and integrates it at the most fundamental level with the skin-effect correction.

The wave number for Maxwell's equations includes both dielectric permittivity and electric conductivity as real and imaginary part of a complex-valued quantity. Only the low-frequency limit considers the permittivity negligible and reduces the wave number to a complex-valued function of conductivity only. In this limit the square of the wave number is purely imaginary and directly proportional to the electric conductivity.

$$k^2 = \frac{\omega^2}{c^2}\mu_r\left(\varepsilon_r + i\frac{\sigma}{\omega\varepsilon_0}\right) \cong i\frac{\omega^2}{c^2}\mu_r\frac{\sigma}{\omega\varepsilon_0} \quad (12')$$

The three-coil induction sonde measures the combined voltage between the receivers, as given in equation (3) and low-frequency, cubic polynomial approximated in equation (6). This induced voltage is given in terms of the wave number; using the complete expression from equation (7) includes the full permittivity dependence.

The skin-effect correction uses the cubic term in the wave number and the fact that the imaginary and real parts were equal due to the square root of the imaginary unit:

$$\sqrt{i} = \pm\frac{1+i}{\sqrt{2}} \quad (8)$$

With the dielectric permittivity included in the square root, this assumption of equal real and imaginary parts does not hold any more. However, the cubic polynomial expansion (9) of the voltage in terms of the wave number still holds.

$$U_l = -i\omega\mu\frac{M_T}{2\pi}\left(\left(\frac{M_1}{2r_1} - \frac{M_2}{2r_2}\right)k^2 + i\left(\frac{M_1}{3} - \frac{M_2}{3}\right)k^3\right) \quad (9l')$$

$$U_t = -i\omega\mu\frac{M_T}{4\pi}\left(\left(\frac{M_1}{2r_1} - \frac{M_2}{2r_2}\right)k^2 + 2i\left(\frac{M_1}{3} - \frac{M_2}{3}\right)k^3\right) \quad (9t')$$

The cubic polynomial can be solved in closed form as is described in M. Abramowitz and I. A. Stegun, "Handbook of Mathematical Functions", Dover (1964, 9th Ed. 1972), eq. 3.8.2, p. 17, i.e., the roots of the polynomial are given as simple arithmetic expressions. Considering that the cubic polynomial coefficients are already complex valued the inversion for the full wave number including the dielectric permittivity does not generate any further computational overhead.

For the cubic polynomial inversion the full wave number (3) is considered, albeit with the assumption for the relative magnetic permeability $\mu_r=1$.

A general cubic polynomial equation has the form:

$$a_3 z^3 + a_2 z^2 + a_1 z + a_0 = b \quad (16)$$

with complex-valued coefficients. This polynomial is simplified to:

$$z^3 + \frac{a_2}{a_3}z^2 + \frac{a_1}{a_3}z + \frac{a_0 - b}{a_3} = z^3 + c_2 z^2 + c_1 z + c_0 = 0 \quad (17)$$

The new coefficients are used to define two auxiliary quantities:

$$d = \frac{c_1}{3} - \frac{c_2^2}{9} \quad (18)$$

$$e = \frac{1}{6}(c_1 c_2 - 3c_0) - \frac{c_2^3}{27}$$

These two auxiliary quantities in turn define two additional quantities:

$$f_1 = \sqrt[3]{e + \sqrt{d^3 + e^2}} \quad (19)$$

$$f_2 = \sqrt[3]{e - \sqrt{d^3 + e^2}}$$

Finally the coefficients and the auxiliary quantities give the three roots of the cubic polynomial:

$$z_1 = (f_1 + f_2) - \frac{c_2}{3} \quad (20a)$$

$$z_2 = -\frac{1}{2}(f_1 + f_2) - \frac{c_2}{3} + i\frac{\sqrt{3}}{2}(f_1 - f_2) \quad (20b)$$

$$z_3 = -\frac{1}{2}(f_1 + f_2) - \frac{c_2}{3} - i\frac{\sqrt{3}}{2}(f_1 - f_2) \quad (20c)$$

Testing of this algorithm on the cubic polynomials for the induced-voltage signals shows that only the first root (20a) provides the physically correct solution for the wave number. The other roots lead to negative electric conductivities and so may be ignored.

This cubic polynomial solution implicitly accounts for skin effect and permittivity. It no longer makes sense to distinguish in-phase and quadrature signals, since the permittivity and conductivity have been combined to a complex-valued quantity that already is skewed in phase against the measured signals. At the same time, the cubic polynomial inversion implicitly performs the act that was explicitly used to correct the quadratic-order apparent conductivity for the skin-effect distortion.

Testing on synthetic data shows a systematic discrepancy in the apparent dielectric permittivity between the known input data and the inverted results in certain circumstances: the inverted permittivities are systematically higher than the input values; this discrepancy increases rapidly at higher conductivities (lower resistivities). Around 10 Ωm the discrepancy is about 550 while at 1 Ωm it becomes about 55000. Such discrepancy may unacceptable for more conductive shales.

In this situation an iterative inversion of the full equations (6) for the wave number can provide accurate and reliable results for both apparent electric conductivity and dielectric permittivity. The cubic polynomial solution serves as initial estimate.

Formally, the measured signals consist of two independent, real-valued signals that are inverted for two independent, real valued quantities: dielectric permittivity and electric conductivity. Therefore, naively the inversion constitutes a two-dimensional, real-valued problem with four independent sensitivity derivatives. However, the target quantities constitute real and imaginary part of a complex-valued parameter. The measured-voltage signal is a complex-valued function of this parameter; in fact, it is a holomorphic function that obeys the Cauchy-Riemann identities.

In the theory of complex functions (see, for example, L. Ahlfors, "Complex Analysis", $2^{nd}$ Edition, McGraw Hill (1966), Ch. 2.1, pp. 21-33), elementary functions are a special class of holomorphic functions. Elementary functions are defined as finite-order sums or products of polynomials, exponentials and logarithms. Hence trigonometric and hyperbolic functions and their inverse all are elementary functions. These functions may have complex-valued arguments and then become complex-valued.

A complex-valued function $w(=u+iv)$ of a complex argument $z(=x+iy)$ is called a holomorphic function if it depends only on the complex variable $z$, but not its complex conjugate $\bar{z}(=x-iy)$. In the case of the electromagnetic Green function the holomorphism is important to illustrate that the electromagnetic signal depends only on the complex dielectric constant with a positive imaginary part. The positive imaginary part describes the dissipation of the electromagnetic signal in lossy media; a negative imaginary part would describe an exponential growth of the signal in blatant violation of energy conservation.

A holomorphic function $w(z)=u(x,y)+iv(x,y)$ is differentiable and obeys the Cauchy-Riemann identities:

$$\frac{\partial u}{\partial x} = \frac{\partial v}{\partial y} \qquad (I)$$
$$\frac{\partial u}{\partial y} = -\frac{\partial v}{\partial x}$$

These identities reflect the fact that the holomorphic function does not depend on $\bar{z}(=x-iy)$.

These holomorphic functions and their Cauchy-Riemann identities are well-established general mathematical concepts in the theory of complex functions, but to date their manifestation in the physics of electromagnetic induction measurements has not been appreciated. The electromagnetic Green function describes the complex-valued transmitter-receiver signals as holomorphic function of the complex dielectric constant. Hence the in-phase (R-) and quadrature (X-)signals, $U_R$ and $U_X$, as real and imaginary part of the received induction signal obey Cauchy-Riemann identities in their dependence on the electric conductivity and dielectric permittivity:

$$\frac{\partial U_R}{\partial \sigma} = \frac{\partial U_X}{\omega \varepsilon_0 \partial \varepsilon_r} \qquad (II)$$
$$\frac{\partial U_X}{\partial \sigma} = -\frac{\partial U_R}{\omega \varepsilon_0 \partial \varepsilon_r}$$

The in-phase and quadrature measurements, $U_R$ and $U_X$, can be simultaneously inverted for the relative dielectric permittivity and the electric conductivity. As alternative to the traditional conductivity-conversion method or the cubic polynomial inversion, we may use an iterative inversion algorithm. Such an iterative inversion algorithm provides considerable advantages: it is numerically more stable, converges rapidly and involves the explicit Green-function expressions.

The holomorphic character eliminates two of the four sensitivity derivatives and combines the remaining two sensitivities into a single, complex-valued derivative. The close-form solution for the induced-voltage signals readily provides close-form expressions for the sensitivity to the wave number:

$$U_l = -i\omega\mu \frac{M_T}{2\pi} \left( \frac{M_1 e^{ikr_1}}{r_1^3}(1-ikr_1) - \frac{M_2 e^{ikr_2}}{r_2^3}(1-ikr_2) \right) \qquad (21l)$$

$$U_t = \qquad (21t)$$
$$-i\omega\mu \frac{M_T}{4\pi} \left( \frac{M_1 e^{ikr_1}}{r_1^3}(1-ikr_1-k^2r_1^2) - \frac{M_2 e^{ikr_2}}{r_2^3}(1-ikr_2-k^2r_2^2) \right)$$

$$\frac{dU_l}{dk} = -i\omega\mu \frac{M_T}{2\pi} \left( \frac{M_1 e^{ikr_1}}{r_1} - \frac{M_2 e^{ikr_2}}{r_2} \right) k \qquad (22l)$$

$$\frac{dU_t}{dk} = i\omega\mu \frac{M_T}{4\pi} \left( \frac{M_1 e^{ikr_1}}{r_1}(1+ikr_1) - \frac{M_2 e^{ikr_2}}{r_2}(1+ikr_2) \right) k \qquad (22t)$$

These close-form expressions no longer rely on the low-frequency, cubic polynomial approximation. They serve to minimize the squared difference between measured induction-voltage data $U_{meas}$ and their simulated reproduction $U_{simul}$.

$$L = \frac{1}{2}(U_{meas} - U_{simul})^2 \qquad (23)$$
$$\Rightarrow \frac{d}{dk}L$$
$$= (U_{meas} - U_{simul})\frac{dU_{simul}}{dk}$$
$$= 0$$

The iteration uses a Newton-Raphson algorithm, assuming that the $(n-1)^{st}$ iteration is only linearly different from the true value:

$$U_{meas} - U_{simul}^{(n-1)} = \frac{dU_{simul}^{(n-1)}}{dk}(k^{(n)} - k^{(n-1)}) \qquad (24)$$

This relationship provides the iterative update for the wave number $k^{(n)}$:

$$k^{(n)} = k^{(n-1)} + (U_{meas} - U_{simul}^{(n-1)})/(dU_{simul}^{(n-1)}/dk) \qquad (25)$$

The updated wave number is then used in the close-form expressions for responses (21) and sensitivities (22) to determine the $n^{th}$ iteration.

This iterative-inversion algorithm is the same for both polarizations; only the response (21) and sensitivity functions (22) differ. The algorithm converges rapidly, usually within three to four iterations, accurately reproducing both dielectric permittivity and electric conductivity. With the full electromagnetic wave $e^{ikr}$ included the skin-effect correction is implicit in the algorithm.

For conductive media above 1000 mS/m (below 1 Ωm) the inversion for the transversely polarized induction sonde tends to become unstable, leading to negative permittivities that then diverge in the iteration. Here it proves necessary to impose a positivity constraint on both dielectric permittivity and electric conductivity to ensure a good convergence.

In that regard, extending the iterative inversion algorithm from the linear expression (24) described above to a higher-order polynomial expression lead to improved performance with better numerical stability and more rapid convergence. Application of the principles herein to a quadratic and cubic expansion are provided below. Higher order polynomial expansions beyond cubic order are technically feasible but are not explicitly described at least because a person of skill could generate such based on a review of this disclosure, and because any advantages of using higher-order polynomial expressions beyond cubic order may be counter-balanced by the computational effort involved. For purposes of this specification, a higher order polynomial means a quadratic polynomial or greater. That is, for example, the phrase: "a higher-order polynomial expression" excludes only a linear expression.

Equation (24) assumes that the measured induction signal $U_{meas}$ is linearly approximated by the simulated signal $U_{simul}$ and its first derivative. The correaction is given as update in the wave number $(k^{(n)}-k^{(n-1)})$. A first generalization of equation (24) is an expansion to quadratic order:

$$U_{meas} = U_{simul}^{(n-1)} + \frac{dU_{simul}^{(n-1)}}{dk}(k^{(n)} - k^{(n-1)}) + \frac{1}{2}\frac{d^2 U_{simul}^{(n-1)}}{dk^2}(k^{(n)} - k^{(n-1)})^2 \quad (102)$$

A second generalization of equation (24) is the expansion to cubic order:

$$U_{meas} = U_{simul}^{(n-1)} + \frac{dU_{simul}^{(n-1)}}{dk}(k^{(n)} - k^{(n-1)}) + \frac{1}{2}\frac{d^2 U_{simul}^{(n-1)}}{dk^2}(k^{(n)} - k^{(n-1)})^2 + \frac{1}{6}\frac{d^3 U_{simul}^{(n-1)}}{dk^3}(k^{(n)} - k^{(n-1)})^3 \quad (103)$$

As with the linear algorithm, both the quadratic and cubic algorithms provide an iterative update for the wavenumber $k^{(n)}$. With respect to application of the iterative update to the quadratic order, equation (102) is first re-written as quadratic equation in the wave-number update $(k^{(n)}-k^{(n-1)})$.

$$(k^{(n)} - k^{(n-1)})^2 + 2\frac{dU_{simul}^{(n-1)}/dk}{d^2 U_{simul}^{(n-1)}/dk^2}(k^{(n)} - k^{(n-1)}) + 2\frac{U_{simul}^{(n-1)} - U_{meas}}{d^2 U_{simul}^{(n-1)}/dk^2} = 0 \quad (104)$$

Equation (104) can then be used to solve for the update:

$$k^{(n)} = k^{(n-1)} - \frac{dU_{simul}^{(n-1)}/dk}{d^2 U_{simul}^{(n-1)}/dk^2} \pm \sqrt{\left(\frac{dU_{simul}^{(n-1)}/dk}{d^2 U_{simul}^{(n-1)}/dk^2}\right)^2 - 2\frac{U_{simul}^{(n-1)} - U_{meas}}{d^2 U_{simul}^{(n-1)}/dk^2}} \quad (105)$$

Equation (105) replaces the linear update equation (25) when applying the quadratic iterative inversion algorithm.

It is noted that equation (105) gives two solutions; however, only the positive sign is the physically correct solution, since $U_{simul}=U_{meas}$ would render any further iteration unnecessary; hence the leading term and the square root must cancel each other.

The only additional calculations needed with respect to equation (105) beyond those provided for in connection with applying the linear iterative algorithm, are calculations of the second derivatives in equations (102, 104, 105) from the first derivatives in equations (22):

$$\frac{d^2 U_l}{dk^2} = \frac{d}{dk}\frac{dU_l}{dk} = -i\omega\mu\frac{M_T}{2\pi}\left[\left(\frac{M_1 e^{ikr_1}}{r_1} - \frac{M_2 e^{ikr_2}}{r_2}\right) + ik(M_1 e^{ikr_1} - M_2 e^{ikr_2})\right] \quad (106l)$$

$$\frac{d^2 U_t}{dk^2} = \frac{d}{dk}\frac{dU_t}{dk} = i\omega\mu\frac{M_T}{4\pi}\left[\begin{array}{l}\left(\frac{M_1 e^{ikr_1}}{r_1} - \frac{M_2 e^{ikr_2}}{r_2}\right) + 3ik(M_1 e^{ikr_1} - M_2 e^{ikr_2}) - \\ -k^2(M_1 r_1 e^{ikr_1} - M_2 r_2 e^{ikr_2})\end{array}\right] \quad (106t)$$

The updated wave number $k^{(n)}$ in equation (105) is now used to compute and update $U_{simul}^{(n)}$ in equations (21).

With respect to application of the iterative update to the cubic order, equation (103) is first re-written as cubic equation in the wave-number update $(k^{(n)}-k^{n-1})$:

$$(k^{(n)} - k^{(n-1)})^3 + 3\frac{d^2 U_{simul}^{(n-1)}/dk^2}{d^3 U_{simul}^{(n-1)}/dk^3}(k^{(n)} - k^{(n-1)})^2 + 6\frac{dU_{simul}^{(n-1)}/dk}{d^3 U_{simul}^{(n-1)}/dk^3}(k^{(n)} - k^{(n-1)}) + 6\frac{U_{simul}^{(n-1)} - U_{meas}}{d^3 U_{simul}^{(n-1)}/dk^3} = 0 \quad (107)$$

This cubic polynomial is solved in closed form as described above in connection with equations 16-20 (including equations 20a, 20b and 20c). In the present context of a cubic iterative inversion algorithm, the coefficients d and e in equation (18) are:

$$d = \frac{c_1}{3} - \frac{c_2^2}{9} = 2\frac{dU_{simul}^{(n-1)}/dk}{d^3 U_{simul}^{(n-1)}/dk^3} - \frac{1}{3}\left(\frac{d^2 U_{simul}^{(n-1)}/dk^2}{d^3 U_{simul}^{(n-1)}/dk^3}\right)^2 \quad (108)$$

$$e = \frac{1}{6}(c_1 c_2 - 3c_0) - \frac{c_2^3}{27}$$
$$= 3\frac{d^2 U_{simul}^{(n-1)}/dk^2}{d^3 U_{simul}^{(n-1)}/dk^3}\frac{dU_{simul}^{(n-1)}/dk}{d^3 U_{simul}^{(n-1)}/dk^3} -$$
$$3\frac{U_{simul}^{(n-1)} - U_{meas}}{d^3 U_{simul}^{(n-1)}/dk^3} - \frac{2}{9}\left(\frac{d^2 U_{simul}^{(n-1)}/dk^2}{d^3 U_{simul}^{(n-1)}/dk^3}\right)^3 \quad (109)$$

The coefficients $f_1$ and $f_2$ (see equation 19 above) and the final solutions $z_1, z_2, z_3$ (see equations 20 above) all constitute lengthy expressions and are readily coded in a computer program. Only one solution in equations (20) will provide physically reasonable results; the other two solutions lead to negative conductivities or permittivities, which is not a physical reality in the present context.

Finally, the third derivatives $d^3U_{l,t}/dk^3$ as derivatives of the expressions (106) should be calculated:

$$\frac{d^3 U_l}{dk^3} = \frac{d}{dk}\frac{d^2 U_l}{dk^2} = \qquad (110l)$$
$$-i\omega\mu\frac{M_T}{2\pi}[2i(M_1 e^{ikr_1} - M_2 e^{ikr_2}) - k(M_1 r_1 e^{ikr_1} - M_2 r_2 e^{ikr_2})]$$

$$\frac{d^3 U_t}{dk^3} = \frac{d}{dk}\frac{d^2 U_t}{dk^2} = \qquad (110t)$$
$$i\omega\mu\frac{M_T}{4\pi}\begin{bmatrix} 4i(M_1 e^{ikr_1} - M_2 e^{ikr_2}) - 5k(M_1 r_1 e^{ikr_1} - M_2 r_2 e^{ikr_2}) - \\ -ik^2((M_1 r_1^2 e^{ikr_1} - M_2 r_2^2 e^{ikr_2})) \end{bmatrix}$$

The present invention relies on the measurement of the quadrature signal with a comparable accuracy and precision as the in-phase-signal measurement (as is possible with current induction tools). The wave number is considered in its complete form (3), including the dielectric permittivity; the induction approximation of negligible permittivity is abandoned.

$$k = \frac{\omega}{c}\sqrt{\mu_r}\sqrt{\varepsilon_r + i\frac{\sigma}{\omega\varepsilon_0}} \qquad (3)$$

Only the relative magnetic permeability is assumed to be $\mu_r = 1$.

The low-frequency expansion to cubic order in the wave number k (equation 9) can be solved in closed form: the first root of the cubic polynomial constitutes an improved solution for the wave number and hence simultaneously for the apparent dielectric permittivity and electric conductivity. This cubic polynomial inversion implicitly contains the skin-effect correction.

The cubic polynomial inversion can provide an improved apparent electric conductivity, while the apparent dielectric permittivity can tend to be of poor quality. An iterative inversion algorithm provides accurate, reliable and numerically stable results for both dielectric permittivity and electric conductivity from R- and X-signals simultaneously.

This iterative inversion algorithm implicitly uses the fact that permittivity and conductivity are combined into a single, complex-valued quantity and that the R- and X-signal combined as complex-valued quantity constitute a holomorphic function of the complex permittivity. The holomorphic character of the signal renders the Cauchy-Riemann identities valid in the signal sensitivity with respect to the wave number.

It will be appreciated that various changes can be made while staying within the scope of the invention.

The invention claimed is:

1. A method of inverting induction logging data for evaluating the properties of underground formations surrounding a borehole, the data comprising induction voltage measurements obtained from a tool placed close to the formations of interest, the method comprising:
   (a) operating a tool in a borehole to obtain induction voltage data;
   (b) defining a relationship relating the induction voltage to wave number, dielectric permittivity and conductivity;
      defining a cubic polynomial expansion of the relationship; and
      solving the cubic polynomial relationship using the voltage measurements to obtain values for conductivity that includes skin-effect correction and apparent dielectric permittivity; and
   (c) using the obtained values for conductivity and apparent dielectric permittivity to derive a simulated value of induction voltage;
      determining the difference between the simulated value of the induction voltage and the measured induction voltage; and
      using a higher-order polynomial expression to iteratively update the values of conductivity and dielectric permittivity used for the derivation of the simulated value of induction voltage to minimise its difference with respect to the measured value.

2. A method as claimed in claim 1, wherein the relationship relating induction voltage to wave number, dielectric permittivity and conductivity is:

$$k = \frac{\omega}{c}\sqrt{\mu_r}\sqrt{\varepsilon_r + i\frac{\sigma}{\omega\varepsilon_0}}$$

where k is wave number, $\omega$ is circular frequency, c is the speed of light in a vacuum, $\mu_r$ is relative magnetic permeability, $\varepsilon_r$ is relative permittivity, $\varepsilon_0$ is the absolute dielectric permittivity of a vacuum and $\sigma$ is conductivity.

3. A method as claimed in claim 1, further comprising deriving roots of the cubic polynomial and using at least one of the roots to obtain the wave number.

4. A method as claimed in claim 3, further comprising ignoring roots giving physically impossible values for parameters of interest.

5. A method as claimed in claim 1, wherein the step of using a higher-order polynomial expression to iteratively update the values of conductivity and dielectric permittivity used for the derivation of the simulated value of induction voltage to minimise its difference with respect to the measured value, comprises minimising a squared difference between measured induction voltage $U_{meas}$ and a simulated reproduction $U_{simul}$ according to the relationship:

$$L = \frac{1}{2}(U_{meas} - U_{simul})^2 \Rightarrow \frac{d}{dk}L = (U_{meas} - U_{simul})\frac{dU_{simul}}{dk} = 0.$$

6. A method as claimed in claim 5, wherein the higher order polynomial expression is a quadratic expression according to:

$$U_{meas} = U_{simul}^{(n-1)} + \frac{dU_{simul}^{(n-1)}}{dk}(k^{(n)} - k^{(n-1)}) + \frac{1}{2}\frac{d^2 U_{simul}^{(n-1)}}{dk^2}(k^{(n)} - k^{(n-1)})^2$$

and the wave number $k^{(n)}$ is updated according to the relationship:

$$k^{(n)} = k^{(n-1)} - \frac{dU_{simul}^{(n-1)}/dk}{d^2 U_{simul}^{(n-1)}/dk^2}$$
$$\pm \sqrt{\left(\frac{dU_{simul}^{(n-1)}/dk}{d^2 U_{simul}^{(n-1)}/dk^2}\right)^2 - 2\frac{U_{simul}^{(n-1)} - U_{meas}}{d^2 U_{simul}^{(n-1)}/dk^2}}.$$

7. A method as claimed in claim 6, further comprising deriving roots of the cubic polynomial and ignoring roots giving physically impossible values for parameters of interest.

8. A method as claimed in claim 5, wherein the higher order polynomial expression is a cubic expression according to:

$$U_{meas} = U_{simul}^{(n-1)} + \frac{dU_{simul}^{(n-1)}}{dk}(k^{(n)} - k^{(n-1)}) +$$
$$\frac{1}{2}\frac{d^2 U_{simul}^{(n-1)}}{dk^2}(k^{(n)} - k^{(n-1)})^2 + \frac{1}{6}\frac{d^3 U_{simul}^{(n-1)}}{dk^3}(k^{(n)} - k^{(n-1)})^3$$

and the wave number $k^{(n)}$ is updated according to the relationship:

$$(k^{(n)} - k^{(n-1)})^3 + 3\frac{d^2 U_{simul}^{(n-1)}/dk^2}{d^3 U_{simul}^{(n-1)}/dk^3}(k^{(n)} - k^{(n-1)})^2 +$$
$$6\frac{dU_{simul}^{(n-1)}/dk}{d^3 U_{simul}^{(n-1)}/dk^3}(k^{(n)} - k^{(n-1)}) + 6\frac{U_{simul}^{(n-1)} - U_{meas}}{d^3 U_{simul}^{(n-1)}/dk^3} = 0.$$

9. A method as claimed in claim 8, further comprising deriving roots of the cubic polynomial and ignoring roots giving physically impossible values for parameters of interest.

10. A method as claimed in claim 1, wherein the induction voltage measurements comprise in-phase and quadrature measurements of substantially the same accuracy and resolution.

11. A method as claimed in claim 1, wherein the induction logging data is obtained from a three-coil tool comprising a transmitter coil with magnetic dipole moment $M_T$, a main receiver coil with magnetic dipole moment $M_1$ at distance $r_1$ from the transmitter coil, and a bucking coil with a magnetic moment $M_2$ at distance $r_2$ from the transmitter coil, the dipole moments being aligned substantially parallel to the axis of the tool, the cubic polynomial expansion comprising:

$$U_l = -i\omega\mu\frac{M_T}{2\pi}\left(\left(\frac{M_1}{2r_1} - \frac{M_2}{2r_2}\right)k^2 + i\left(\frac{M_1}{3} - \frac{M_2}{3}\right)k^3\right)$$

wherein $U_l$ is the induction voltage.

12. A method as claimed in claim 11, wherein the simulated value of induction voltage is derived according to the relationship $$U_l = -i\omega\mu\frac{M_T}{2\pi}\left(\frac{M_1 e^{ikr_1}}{r_1^3}(1 - ikr_1) - \frac{M_2 e^{ikr_2}}{r_2^3}(1 - ikr_2)\right)$$

using a sensitivity function derived according to the relationship:

$$\frac{dU_l}{dk} = -i\omega\mu\frac{M_T}{2\pi}\left(\frac{M_1 e^{ikr_1}}{r_1} - \frac{M_2 e^{ikr_2}}{r_2}\right)k$$

where $e^{ikr}$ is the full electromagnetic wave.

13. A method as claimed in claim 1, wherein the induction logging data is obtained from a three-coil tool comprising a transmitter coil with magnetic dipole moment $M_T$, a main receiver coil with magnetic dipole moment $M_1$ at distance $r_1$ from the transmitter coil, and a bucking coil with a magnetic moment $M_2$ at distance $r_2$ from the transmitter coil, the dipole moments being aligned substantially transverse to the axis of the tool, the cubic polynomial expansion comprising:

$$U_t = -i\omega\mu\frac{M_T}{4\pi}\left(\left(\frac{M_1}{2r_1} - \frac{M_2}{2r_2}\right)k^2 + 2i\left(\frac{M_1}{3} - \frac{M_2}{3}\right)k^3\right)$$

wherein $U_t$ is the induction voltage.

14. A method as claimed in claim 13, wherein the simulated value of induction voltage is derived according to the relationship $$U_t = -i\omega\mu\frac{M_T}{4\pi}\left(\frac{M_1 e^{ikr_1}}{r_1^3}(1 - ikr_1 - k^2 r_1^2) - \frac{M_2 e^{ikr_2}}{r_2^3}(1 - ikr_2 - k^2 r_2^2)\right)$$

using a sensitivity function derived according to the relationship:

$$\frac{dU_t}{dk} = i\omega\mu\frac{M_T}{4\pi}\left(\frac{M_1 e^{ikr_1}}{r_1}(1 + ikr_1) - \frac{M_2 e^{ikr_2}}{r_2}(1 + ikr_2)\right)k$$

where $e^{ikr}$ is the full electromagnetic wave.

15. A method of inverting induction logging data for evaluating the properties of underground formations surrounding a borehole, the data comprising induction voltage measurements obtained from a tool placed close to the formations of interest, the method comprising:
 (a) operating a tool in a borehole to obtain induction voltage data;
 (b) defining a relationship relating the induction voltage to wave number, dielectric permittivity and conductivity;
   defining a n>2 polynomial expansion of the relationship, wherein the n>2 polynomial expansion comprises a cubic polynomial expansion, a higher-order polynomial expansion, or combinations thereof; and
   solving the n>2 polynomial relationship using the voltage measurements to obtain values for conductivity that includes skin-effect correction and apparent dielectric permittivity; and
 (c) using the obtained values for conductivity and apparent dielectric permittivity to derive a simulated value of induction voltage;
   determining the difference between the simulated value of the induction voltage and the measured induction voltage; and
   using a n+1 polynomial expression to iteratively update the values of conductivity and dielectric permittivity used for the derivation of the simulated value of induction voltage to minimise its difference with respect to the measured value.

16. A method as claimed in claim 15, wherein the relationship relating induction voltage to wave number, dielectric permittivity and conductivity is:

$$k = \frac{\omega}{c}\sqrt{\mu_r}\sqrt{\varepsilon_r + i\frac{\sigma}{\omega\varepsilon_0}}$$

where k is wave number, $\omega$ is circular frequency, c is the speed of light in a vacuum, $\mu_r$ is relative magnetic permeability, $\varepsilon_r$ is relative permittivity, $\varepsilon_0$ is the absolute dielectric permittivity of a vacuum and $\sigma$ is conductivity.

17. A method as claimed in claim 15, further comprising deriving roots of the n>2 polynomial and using at least one of the roots to obtain the wave number.

18. A method as claimed in claim 17, further comprising ignoring roots giving physically impossible values for parameters of interest.

19. A method as claimed in claim 15, wherein the induction voltage measurements comprise in-phase and quadrature measurements of substantially the same accuracy and resolution.

20. A method as claimed in claim 15, wherein the induction logging data is obtained from a three-coil tool comprising a transmitter coil with magnetic dipole moment $M_T$, a main receiver coil with magnetic dipole moment $M_1$ at distance $r_1$ from the transmitter coil, and a bucking coil with a magnetic moment $M_2$ at distance $r_2$ from the transmitter coil, the dipole moments being aligned substantially parallel to the axis of the tool, the cubic polynomial expansion comprising:

$$U_I = -i\omega\mu \frac{M_T}{2\pi}\left(\left(\frac{M_1}{2r_1} - \frac{M_2}{2r_2}\right)k^2 + i\left(\frac{M_1}{3} - \frac{M_2}{3}\right)k^3\right)$$

wherein $U_I$ is the induction voltage.

* * * * *